June 7, 1960 R. CALABRESE 2,939,416
DIVERLESS SHIP SALVAGE APPARATUS
Filed Sept. 11, 1956 4 Sheets-Sheet 3

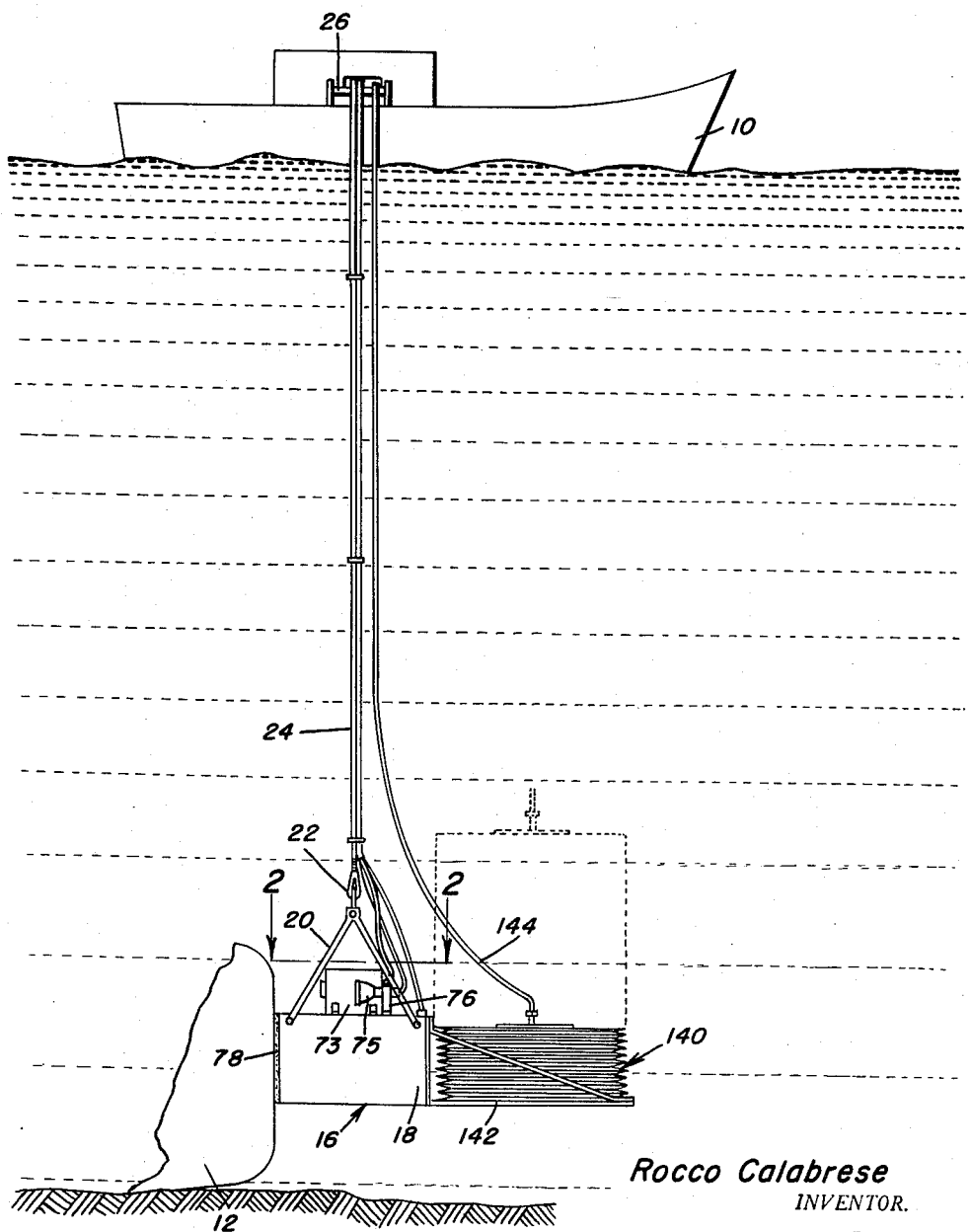

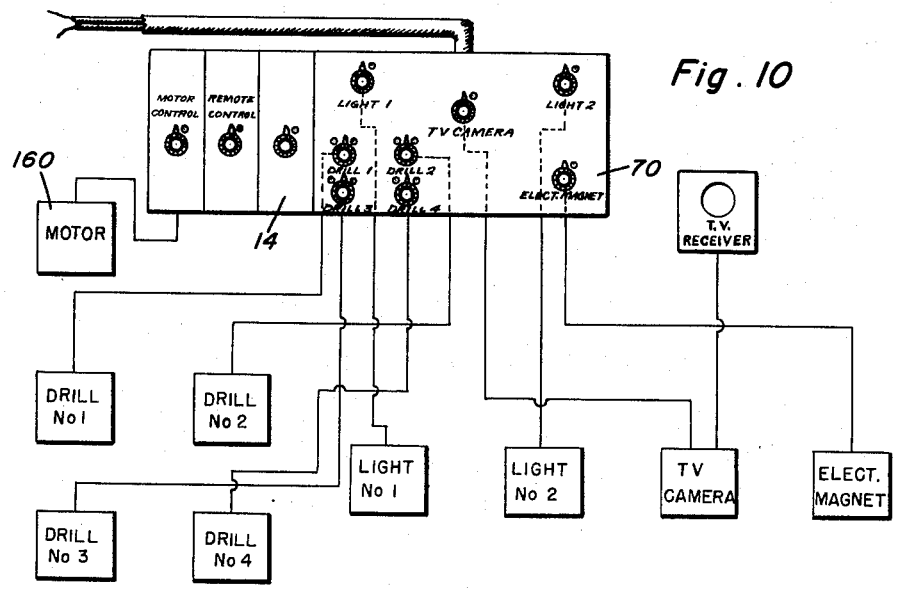
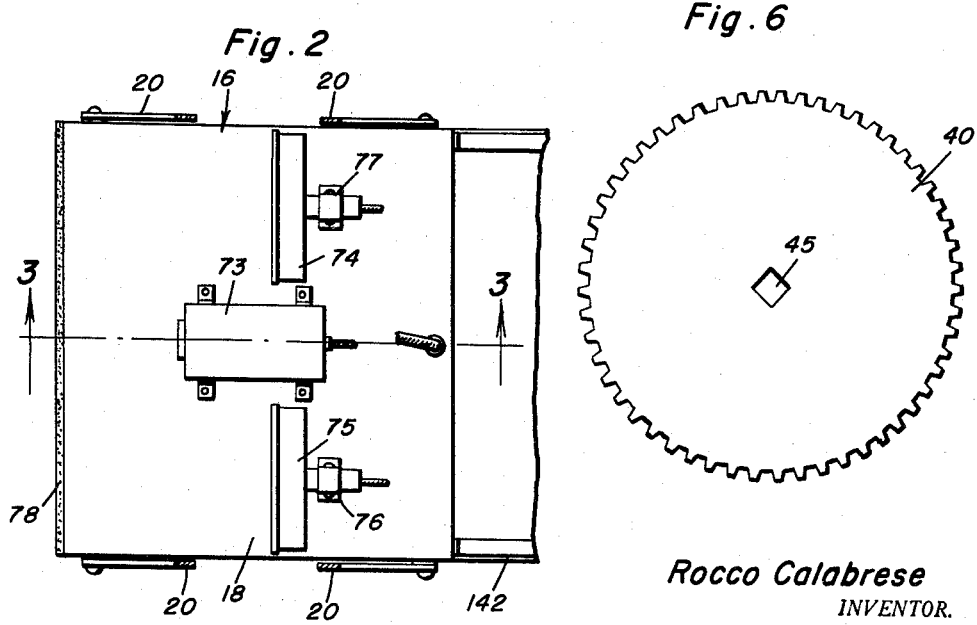

Rocco Calabrese
INVENTOR.

BY
Attorneys

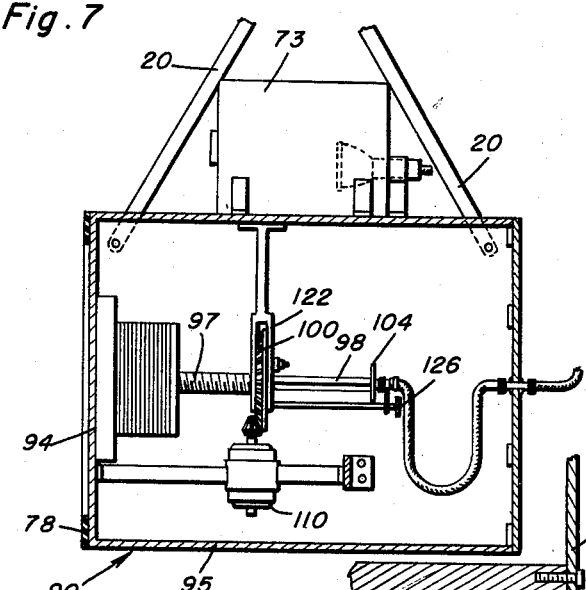
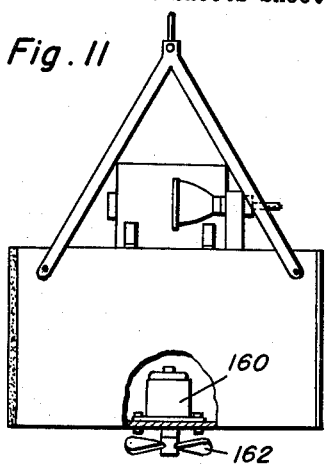
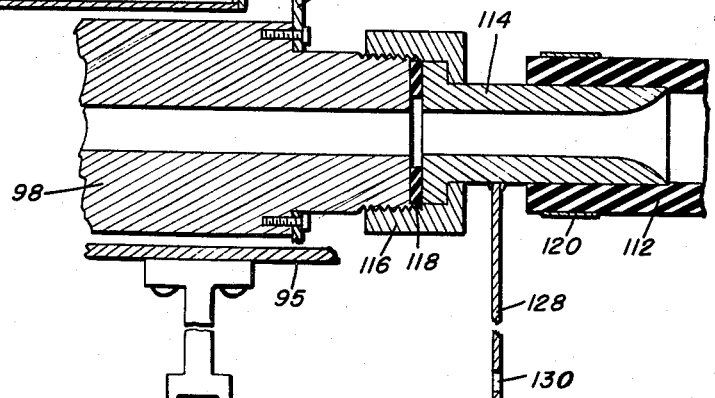
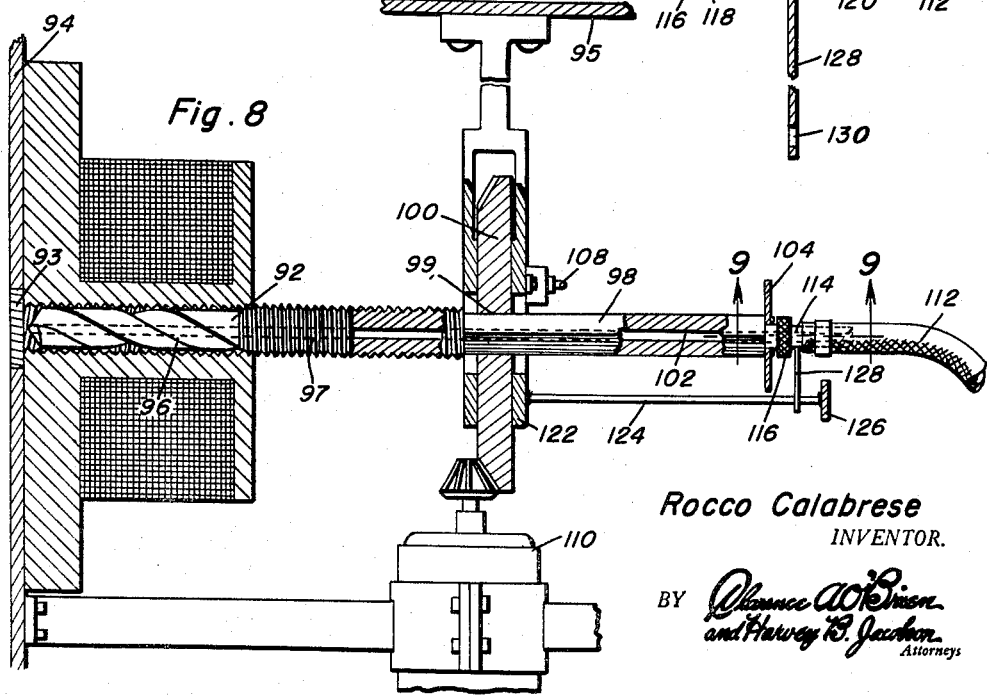
June 7, 1960 — R. CALABRESE — 2,939,416
DIVERLESS SHIP SALVAGE APPARATUS
Filed Sept. 11, 1956 — 4 Sheets-Sheet 4
Rocco Calabrese
INVENTOR.

United States Patent Office 2,939,416
Patented June 7, 1960

2,939,416

DIVERLESS SHIP SALVAGE APPARATUS

Rocco Calabrese, 34 Somerset St., Raritan, N.J.

Filed Sept. 11, 1956, Ser. No. 609,213

7 Claims. (Cl. 114—51)

This invention relates to apparatus for salvaging sunken ships and more particularly to salvaging equipment which dispenses with the need for the services of divers.

An object of the present invention is to provide an apparatus for use in salvaging sunken ships or other objects wherein the apparatus is designed to be used from a salvaging vessel preferably equipped with sonar, television or other detection equipment whereby the sunken ship is capable of being located, the salvaging apparatus including a device which is submersible to the sunken ship, and after reaching the sunken ship through electromagnetic energy, is attracted to it whereby the various operations may be performed remotely, that is, from the salvage vessel.

A further object of the invention is to provide a device which is adapted to be electromagnetically attracted and held to the metal part of a sunken ship, after which one or more drills are actuated from controls carried by the salvage vessel, the one or more drills first passing through a wall of the housing of the device and then passing into the sunken ship. It is within the purview of the invention to utilize the drills as means to anchor the device onto the sunken ship and use them for the conduction of air, food, communication lines and other things that will be required by men trapped in the sunken ship.

A further object of the invention is to provide salvaging apparatus useful from a salvage vessel and adapted to establish communication between a sunken ship and the salvage vessel and provide means to attach a line to the sunken ship, the ultimate aim being to facilitate the lifting of the sunken craft. A number of aids in this operation may be used. For example, the salvage vessel may be provided with sonar or television equipment to help locate the sunken ship, while the device that is lowered into the water in order to establish contact with the sunken ship may be provided with the television camera and a source of light to illuminate the field of vision of the camera, the source of illumination being preferably but not necessarily a hydrophotometer, this being a rather new instrument wihich functions not only to provide illumination but also to help determine the correct focus for the television camera.

A further object of the present invention is to provide a device described above with expansible means that are adapted to be inflated from a source of air or gas under pressure carried on the salvage vessel providing an assistance for elevating the sunken craft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic view showing a salvage ship or vessel equipped with apparatus constructed in accordance with the invention, the apparatus being utilized in connection with the sunken ship that is fragmentarily shown;

Figure 2 is an enlarged fragmentary sectional view taken on the line 2—2 of Figure 1 and showing principally the top part of the device which attaches to the sunken ship;

Figure 6 is an elevational view of a gear constituting a part of the means to propel the bit;

Figure 7 is a sectional view of a modification of the device in Figure 1;

Figure 8 is an enlarged sectional view of the drill bit of Figure 7 and the means for propelling it;

Figure 9 is an enlarged fragmentary sectional view taken on a line 9—9 of Figure 8 and showing principally the coupling between the end of the drill bit and food, air, electric conductors, etc., hose;

Figure 10 is a schematic system diagram in part carried by the salvage vessel while working with a sunken ship and in part submerged as shown in Figure 1;

Figure 11 is an elevational view of a modified form of the invention.

Figure 3:
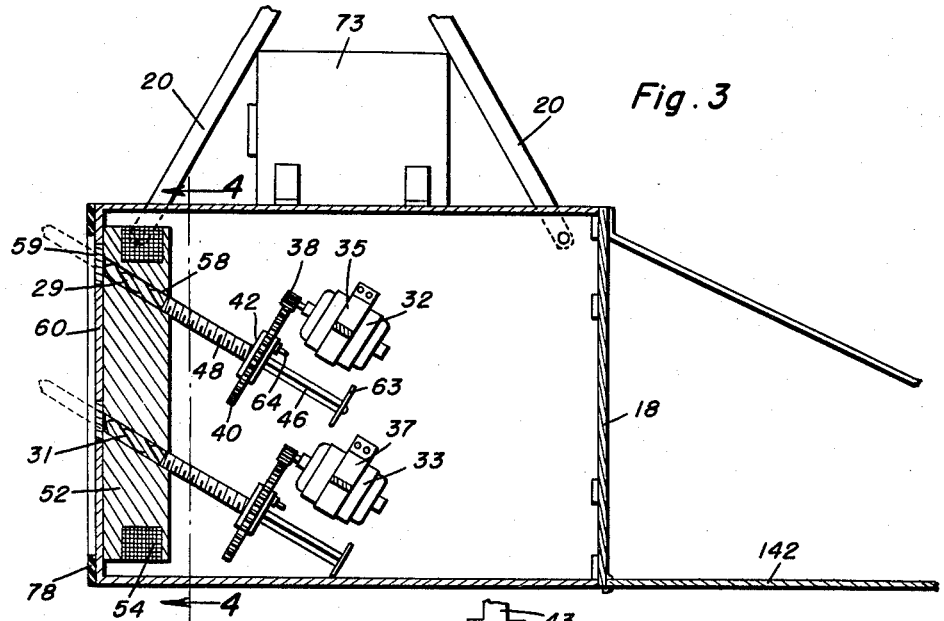
Figure 3 is a vertical sectional view of the device in Figure 1 and taken on the line 3—3 of Figure 2.

In the accompanying drawings there are illustrated salvage ship 10 and a sunken ship 12. The salvage ship or vessel 10 is provided with equipment normally found on such vessels and is illustrated in Figure 1 in such position as to be used in a salvage operation in connection with the sunken ship 12. The sunken ship may be any type of warship or freighter or liner or may represent any other sunken object which is to be lifted from the water. In salvaging operations the services of divers are very often required and in deep and rough water, the divers' task is extremely difficult and dangerous. The apparatus that is adapted to be transported by vessel 10 and used in connection with a sunken ship, does not require the services of a human diver and, is, therefore, particularly useful in deeper water. However, this is not to be construed as excluding use of the apparatus in shallow water.

Salvaging vessel 10 is equipped with sonar or other available underwater detection equipment, this being schematically represented at 14 (Figure 10), and the function of this standard equipment is to help locate the sunken ship 12. After it is located, salvage device 16 is lowered over the side of vessel 10 and the vessel is moved slowly to permit contact to be established between the device 16 and the sunken ship 12. The device consists of a housing 18 having a plurality of lift arms 20 connected to opposite side walls thereof, the lift arms supporting a coupling 22 which has one or more hoisting cables 24 connected with it. The upper extremity of the cable is operatively connected with a hoist 26 which may assume the form of a winch supplemented by various modern equipment, as automatic brakes, powerful engines and the like. One form of the device is seen best in Figures 2–6 inclusive. It consists of the previously mentioned housing 18 and lift arms 20 and is provided with a plurality of drills. This particular form of the device has four drills 28, 29, 30 and 31 and each is operated by its own reversible motor, for example, motors 32 and 33 (Figure 3) for the drills 29 and 31. Motor 32 is mounted on a bracket 35, the latter being secured to walls of the housing 18, while motor 33 is mounted by brackets 37, these brackets also being secured to the walls of the housing. Pinion 38 is on the shaft of motor 32 and is engaged with gear 40, the latter being mounted for rotation in fork 42. This fork is secured by mounting arms 43 and 44 to the walls of the housing 18 and permits gear 40 to rotate but prevents lateral displacement of the gear. The gear has a non-circular central opening 45, for example square, and shank 46 of drill 29 is similarly shaped and passed therethrough. The shank has a threaded part 48 which is disposed in the threaded bore 50 of electromagnet plate 52. This plate is fixed to one wall of the housing 18 and coacts with one or more windings 54 to form a powerful electromagnet. In the rest position (Figure 5) the fluted part 58 of the drill 29 is in the threaded bore 50 and is in alignment with the target area 59 of wall 60 in housing 18. Target area 59 is preferably, but not necessarily, of a material which is easier to drill than the remainder of the housing 18. In the use of the device 16, motor 32 is energized to drive the drill by rotating the threaded part 48 in threaded bore 50. The drive connection is established by the non-circular opening 45 and the corresponding shape of the shank 46 of the drill bit. When the drill bit is advanced the full designed distance, switch actuator 63 which is bolted or otherwise connected to the shank 46, engages the switch 64 that is carried by fork 42, this switch being wired in such manner as to stop the motor. An identical propulsion means for the drill 31 are operatively connected to it and the same holds true for drills 28 and 30. Should a larger number of drills be used there will be a corresponding number of propulsion means for the drills.

It is observed from Figure 3 that drills 29 and 31 are parallel to each other and at an angle to the face of wall 60. This is to firmly anchor them in ship 12 and provide firm holding action therewith when hoisting cable 24 is lifted. Other drill patterns may be adopted, that is, the drills 28, 29, 30 and 31 could be arranged at various angles with respect to each other.

Attention is now invited to Figure 10 where there is control panel 70, the latter being fitted with controls for the individual motors as at 32 and 33 of Figure 3. Each of these motors is reversible so that the drills which they propel may be moved inwardly or outwardly of housing 18 depending on the needs of the particular job. Remote controls, that is, controls on vessel 10 are used to control the entire operation below water level. Among these controls are the control for the electromagnet, the latter being used to attract the device 16 against the metal hull or other metal part of sunken ship 12. A television camera 73 is mounted on the top wall of housing 18 and has its field of view lighted by means of lamps 74 and 75. These lamps are connected by brackets 76 and 77 onto the top wall of housing 18 and may be of standard construction. Hydrophotometer fixtures may be used in order to aid in determining the proper focus for television camera 73. Should this be the case, the hydrophotometer fixtures are operatively connected with the television equipment in a normal way.

After locating the sunken vessel 12 by visual observation or by the aid of electronic equipment, for example, sonar, the device 16 is lowered over the side of the salvage vessel 10 and the salvage vessel is moved slowly until the device 16 comes into close proximity to the sunken ship. As an aid to maneuvering the vessel 10 the television camera 73 is used, with the field of vision being lighted by the previously described light and activities may be viewed on the television receiver located on the vessel. Then, just before contact is made with the sunken ship, the electromagnet is energized thereby attracting device 16 to the ship 12. Seal 78 on the edges of wall 60 of housing 18 is compressed and flattened against the ship 12 before the drills are actuated. Then, from the control panel on vessel 10 the drills are actuated penetrating their target areas in wall 60 and then penetrating the hull or other metal part of the sunken ship 12. The penetration of the hull by the drill bits locks device 16 to the ship 10 and provides means by which the ship 12 may be elevated or at least, aided in its being elevated in response to winding hoisting cable 24 onto the hoist 26.

In the event that there is need for supplying air, food or other necessities into the sunken ship 12, the device 90 (Figures 7–9) may be used in place of the device 16 for initial contact with the ship 12. Device 90 is exceedingly similar to device 16, the only distinction being in the number of drill bits and in the type of drill bit that is used. All other equipment is identical.

In Figure 8, drill 92 is shown in a position where it is about to pass through target area 93 in wall 94 of housing 95. Target area 93 corresponds to target area 59 in Figure 5. Drill 92 has a fluted part 96, a threaded shank 97 and a non-circular shank 98 passing through a non-circular opening 99 in gear 100, these being the same as shown in Figure 6. Drill 92 has a longitudinal passage 102 extending completely through it and forms a conductor for air, food, telephone lines, etc. Switch actuator 104 is secured to shank 98 and is operable with switch 108 to control the motor 110 that drives the drill. Hose 112 is connected to fitting 114, the latter being secured to the inner end of shank 98 by a flanged coupling 116, there being a seal 118 between the confronting ends of fitting 114 and shank 98. Hose clamp 120 on hose 112 schematically represents any type of high pressure hose connection capable of withstanding the subsurface pressures that must be dealt with.

Figure 5:
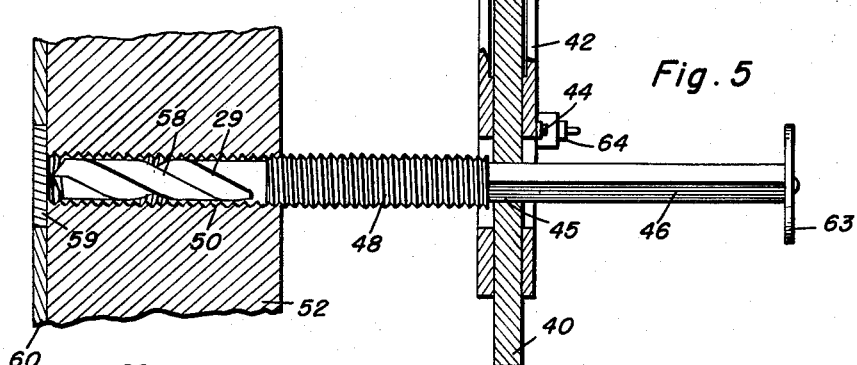
Figure 5 is a fragmentary sectional view showing one of the drill bits of Figure 3 in a position preparatory to piercing a wall of the device housing and penetrating the sunken ship.
Figure 4:
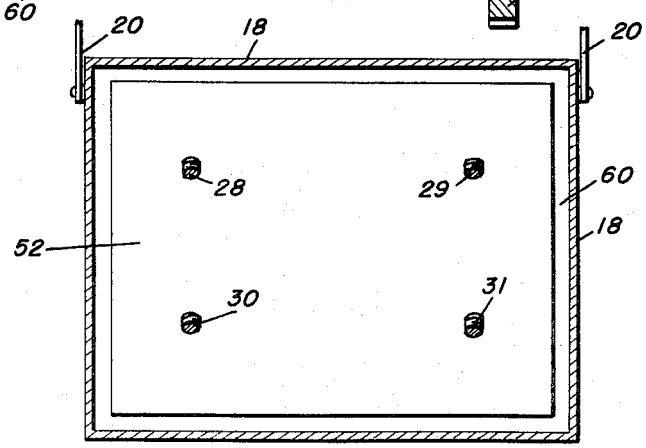
Figure 4 is a sectional view taken on a line 4—4 of Figure 3.

Fork 122 in which gear 100 is mounted for constrained rotation, has a guide 124 secured to it, this guide being also secured to a mounting pedestal 126 that is carried by a wall of housing 95. Slide 128 is welded or otherwise secured to fitting 114 and has an aperture 130 through which guide 124 is passed. Accordingly, as the drill 92 is advanced in response to energization of the reversible motor 110, the hose is advanced with the drill 92 but does not rotate. Relative rotation between fitting 114 and coupling 116 is, however, permitted. It is within the purview of the invention to use a drill bit such as drill 92 in combination with one or more of the drills such as shown in Figure 5 and in either housing 95 or housing 18. Such arrangements may be used with or without specially constructed means to aid in floating the ship 12. These means are seen in Figure 1 and are indicated at 140. They consist of an accordion pleated expansible chamber made of rubber or other flexible material reinforced with metal and mounted above or on the side of housing 18 or housing 95. Support 142 that is welded, bolted or otherwise attached to housing 18 (Figure 1) has the expansible chamber 140 secured to it and an inflation hose 144 connected therewith. This inflation hose is operatively connected to the hoist 26 or another hoist and functions to provide air or gas under pressure to the expansible chamber 140. This, in turn, provides buoyancy for sunken ship 12 and facilitates the lifting thereof.

As shown in Figure 11 motor 160 may be used in place of the expansion tank, or may be used in addition to it. Motor 160 is controlled from the console above (Figure 10) and has a propeller 162 driven by the shaft of the motor. The propeller is arranged to apply a thrust on the housing 18 or 95 in a direction proper to lift the housing and any object connected to the drills in the housing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in salvage operations from a salvage ship equipped with sunken object detection equipment, an apparatus comprising a housing, means to fasten the housing to the sunken object and including a drill in said housing and adapted to penetrate the sunken object, said housing having a wall with a solid portion forming a target area located in front of said drill and through which said drill is adapted to pass to penetrate the ship, means in said housing and having a control structure on the salvage ship for advancing said drill through said target area and into said sunken ship, an expansible casing secured to said housing and adapted to be inflated in order to provide buoyancy to assist in lifting the sunken ship.

2. The apparatus of claim 1 wherein said drill has an access passage therethrough.

3. The apparatus of claim 1 wherein there are a plurality of said drills which are arranged at an angle to each other so as to interlock with the ship when they penetrate the ship.

4. An apparatus to obviate the necessity of human divers in salvaging operations, said apparatus comprising a housing, under water detection means having a viewing part carried by said housing and a receiving part located at a place remote from said housing for observation of the field of view encompassed by said viewing part of the detection means on said housing, a wall of said housing having a plurality of portions more easily drilled than the remainder of the wall and constituting target areas, a plurality of drills, mechanical means mounting said drills in said housing for axial movement toward and through said target areas of said housing, means for propelling said drills through said target areas in order to drill into the sunken object, said drills having their longitudinal axes arranged at an angle to each other so that the drills when penetrated into the object lock said housing onto the sunken object.

5. An apparatus to obviate the necessity of human divers in salvaging operations, said apparatus comprising a housing, under water detection means having a viewing part carried by said housing and a receiving part located at a place remote from said housing for observation of the field of view encompassed by said viewing part of the detection means on said housing, a wall of said housing having a plurality of portions which are more easily drilled than the remainder of said wall and constituting target areas, a plurality of drills, mechanical means mounting said drills in said housing for axial movement toward and through said target areas of said housing, means for propelling said drills through said target areas in order to drill into the sunken object, said drills having their longitudinal axes arranged at an angle to each other so that the drills when penetrated into the object lock said housing onto the sunken object, a seal on the exterior of said housing around said target areas, an electromagnet carried by said housing and adapted to attract the housing onto the sunken object and compress the seal against the surface of the sunken object.

6. The combination of claim 4 wherein said drill propelling means includes at least one electric motor, an electrical circuit in which said motor is operatively connected, a limit switch also in said circuit to control the energization of said motor, and a switch actuator carried by one of said drills and having said limit switch in its path of travel as the drill is axially propelled in order to automatically de-energize said motor in response to attaining an extended position with respect to said housing.

7. The combination of claim 4 wherein at least one of said drills has a passage extending through it, and a conduit attached to said passage through which to conduct air, food, telephone lines to and through the passage in said drill.

References Cited in the file of this patent
UNITED STATES PATENTS

| | | |
|---|---|---|
| 975,534 | King | Nov. 15, 1910 |
| 1,202,519 | Hively | Oct. 24, 1916 |
| 1,333,783 | Sliwinski | Mar. 16, 1920 |
| 1,775,595 | Lieske | Sept. 9, 1930 |
| 1,816,689 | Mirlink | July 28, 1931 |
| 1,880,999 | Sussman | Oct. 4, 1932 |
| 2,060,670 | Hartman | Nov. 10, 1936 |
| 2,215,365 | Vestergren | Sept. 17, 1940 |
| 2,355,086 | Lang | Aug. 8, 1944 |
| 2,359,964 | Barnett | Oct. 10, 1944 |
| 2,413,313 | Cook | Dec. 31, 1946 |

FOREIGN PATENTS

| | | |
|---|---|---|
| 484,809 | Germany | Oct. 22, 1929 |

OTHER REFERENCES

"Electrical Engineering," November, 1955, p. 1024.